W. H. DOANE.
Improvement in Sawing-Machines.
No. 128,472.          Patented July 2, 1872.
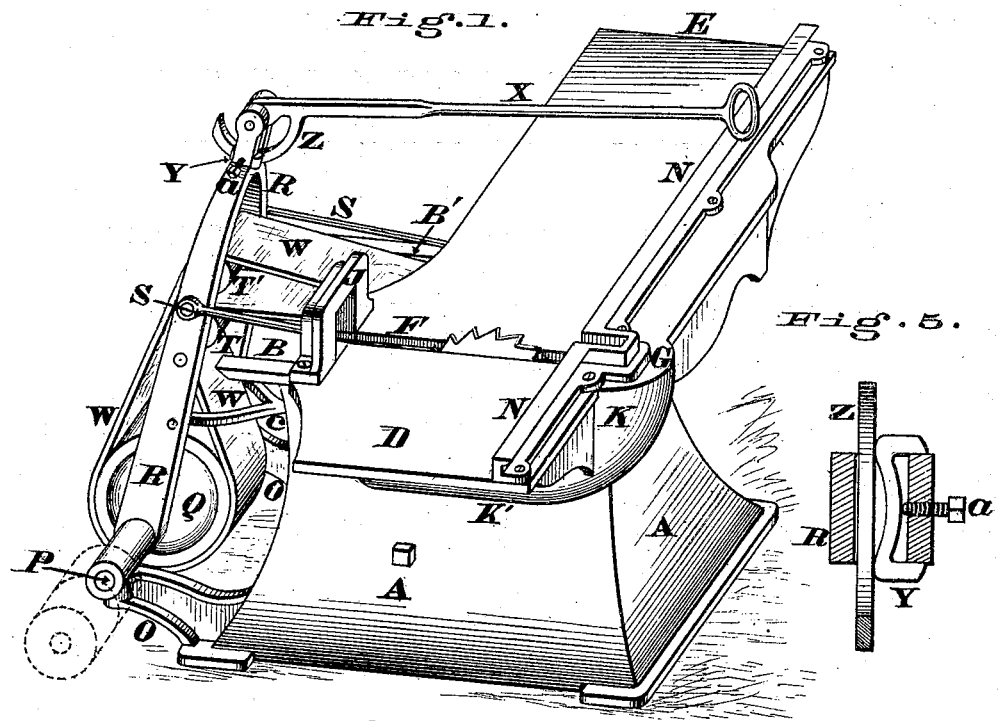
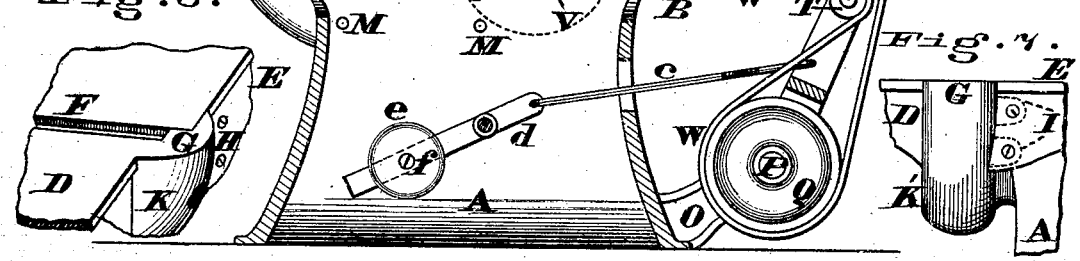
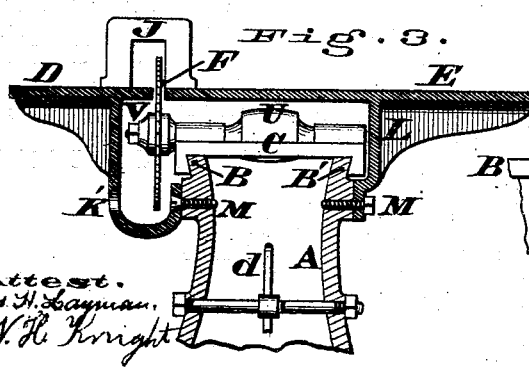
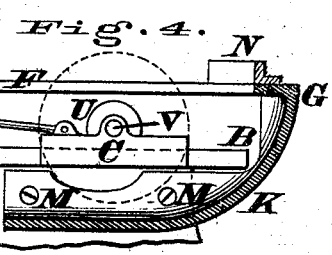

128,472

UNITED STATES PATENT OFFICE.

WILLIAM H. DOANE, OF CINCINNATI, OHIO.

IMPROVEMENT IN SAWING-MACHINES.

Specification forming part of Letters Patent No. 128,472, dated July 2, 1872.

I, WILLIAM H. DOANE, of Cincinnati, Hamilton county, Ohio, have invented a new and useful Improvement in Sawing-Machines, of which the following is a specification:

My invention consists in the employment of a cast-iron rest or table traversed by a slot which nearly separates the table into two parts, whose rear edges are united by a high bridge, and having a stop, N, provided with a slotted elbow, G, on its front edge. My invention further relates to a device whereby the operating handle is held to any convenient position.

In the accompanying drawing, Figure 1 is a perspective view of a machine embodying my improvements. Fig. 2 is a longitudinal section of the same. Fig. 3 is a transverse section in the plane of the counter-balance shaft. Fig. 4 is a longitudinal section through the dust-spout. Fig. 5 is a section through the friction-gib and the operating handle at right angles to the latter. Figs. 6 and 7 are, respectively, a perspective view and an elevation, showing a mode of uniting the members of a two-parted table.

A represents my stand, pedestal, or base, consisting of a single hollow casting rectangular in its horizontal sections, and whose vertical contour is concave, as represented. The upper part of said pedestal takes the form of rails B, which support and guide the saw-carriage C. The table consists of two parts or members, D and E, separated, save at their extreme front edge, by a slot, F, to permit the traverse of the saw when in operation. N is a stop or curb provided with a slotted elbow, G, in which the saw operates at the end of its stroke, said stop N being attached to the front edge of the table.

A modification of my invention consists in so constructing the table that the transverse slot F shall pass entirely across the table, the two parts of the table thus formed being united by the bridge J, Fig. 3, at its rear edge, and the stop N with its elbow G at the front edge. Webs K and L, which extend downward from the table D E and form a part of it, are attached by bolts M to the pedestal, and serve to support the table in the proper horizontal position with room for the traverse of the saw-carriage beneath it. Brackets O, which extend rearwardly from the pedestal, afford journal-bearing for the shaft P of a pulley, Q. Centered on the same shaft are arms R, connected by rods S with the saw-carriage C, to which are journaled sheaves T T', around which, and around the pulley Q, and a pulley, U, on the saw-arbor V, is stretched the band W, which rotates the saw. The arms R are connected at their upper ends, and afford pivot-bearing for a handle, X, which is retained to the represented or any position at which it may be left by the operator by the pressure of a spring-gib, Y, upon the side of a semicircular ring, Z, that projects from the handle. The pressure of the gib Y is tempered by means of a set-screw $a$. In order to cause the arms R to assume and maintain the vertical position when left at liberty, I connect them by forked rod $c$ with a rock-arm, $d$, whose lower extremity is loaded with a weight or bob, $e$, which is secured to any desired height upon said rock-arm by means of a set-screw, $f$.

I claim as new and of my invention—

1. The table D E G, having a transverse slot, F, for the passage of the saw, in combination with the bridge J, all constructed and operated in the manner specified.

2. The table D E G, in combination with the bridge J and stop N, all constructed, arranged, and operating as shown and described.

3. The arrangement of devices X $a$ Y Z, for the purpose indicated.

In testimony of which invention I hereunto set my hand.

WILLIAM H. DOANE.

Attest:
  GEO. H. KNIGHT,
  JAMES H. LAYMAN.